United States Patent
Nagata et al.

[11] Patent Number: 5,918,982
[45] Date of Patent: Jul. 6, 1999

[54] TEMPERATURE DETECTING USING A FORWARD VOLTAGE DROP ACROSS A DIODE

[75] Inventors: Junichi Nagata; Junji Hayakawa, both of Okazaki; Hiroyuki Ban, Hazu-gun, all of Japan

[73] Assignee: Denso Corporation, Kariya, Japan

[21] Appl. No.: 08/927,182

[22] Filed: Sep. 11, 1997

[30] Foreign Application Priority Data

Sep. 12, 1996 [JP] Japan .................................. 8-242219

[51] Int. Cl.⁶ .................................................. G01K 7/00
[52] U.S. Cl. ............................................................. 374/178
[58] Field of Search ........................... 374/152, 178; 327/512; 340/598

[56] References Cited

U.S. PATENT DOCUMENTS

| | | | |
|---|---|---|---|
| 3,812,717 | 5/1974 | Miller et al. | 374/178 |
| 4,071,813 | 1/1978 | Dobkin | 374/178 X |
| 4,331,888 | 5/1982 | Yamauchi | 374/178 X |
| 4,395,139 | 7/1983 | Namiki et al. | 374/178 |
| 5,039,878 | 8/1991 | Armstrong et al. | 327/512 |
| 5,349,336 | 9/1994 | Nishiura et al. | |
| 5,355,123 | 10/1994 | Nishiura et al. | |
| 5,796,290 | 8/1998 | Takahashi | 327/512 |

FOREIGN PATENT DOCUMENTS

| | | |
|---|---|---|
| 63-281031 | 11/1988 | Japan . |
| 1-175615 | 7/1989 | Japan . |
| 3-34360 | 2/1991 | Japan . |
| 6-332555 | 12/1994 | Japan . |
| 2222884 | 3/1990 | United Kingdom . |

*Primary Examiner*—Harshad Patel
*Assistant Examiner*—Robin C. Clark
*Attorney, Agent, or Firm*—Pillsbury Madison & Sutro LLP

[57] ABSTRACT

A temperature detecting circuit detects the rise of ambient temperature, using a forward voltage drop across a diode. The temperature detecting circuit comprises a temperature detecting diode whose cathode is grounded, a first constant current supply device connected with the anode of the temperature detecting diode, for supplying a constant current Ia to the temperature-detecting diode, a rectifying diode whose cathode is connected with the anode of the temperature detecting diode, a second constant current supply device connected with the anode of the rectifying diode, for supplying a constant current Ib to the temperature-detecting diode, a comparator, and a transistor. When the voltage at the anode of the temperature-detecting diode is lower than a reference voltage, the comparator produces a high-level signal indicative of overheating. In response to this, the transistor shorts the anode of the rectifying diode to ground potential to supply the constant current Ib from the second constant current supply device directly to ground potential.

5 Claims, 4 Drawing Sheets

TEMPERATURE DETECTING USING A FORWARD VOLTAGE DROP ACROSS A DIODE

CROSS REFERENCE TO RELATED APPLICATION

This application is based upon and claims the benefit of priority of the prior Japanese Patent Application No. H.8-242219 filed on Sep. 12, 1996, the contents of which are incorporated herein by reference.

BACKGROUND OF THE INVENTION

1. Field of the Invention

The present invention relates to a circuit for detecting the rise of ambient temperature, using a forward voltage drop developed across a diode.

2. Related Art

A temperature detecting circuit has been proposed in Japanese Patent Application Laid-Open No. H.6-332555 and is located, for example, near an output transistor that feeds a load current to an electrical load. This temperature detecting circuit senses that the output transistor has overheated if such overheating has taken place.

The above-cited temperature detecting circuit is shown in FIG. 7A, and comprises a diode D used for temperature detection, a P-channel MOS transistor T1 connected between a voltage source VD and a ground, another P-channel MOS transistor T2 connected between the voltage source VD and the anode of the diode D, a P-channel MOS transistor T3 connected in parallel with the MOS transistor T2 and in series with the diode D, a comparator CMP for comparing a reference voltage Vref from a reference voltage source K with a voltage at the anode of the diode D, a P-channel MOS transistor T4 for connecting or disconnecting a current path going from the voltage source VD to the MOS transistor T3 according to the output from the comparator CMP, and a resistor R2 and an N-channel MOS transistor T5 for inverting the level of the output from the comparator CMP and delivering the output from a terminal S. The cathode of the diode D is coupled to ground potential, or 0 V. A reference current is fed to the P-channel transistor T1 via a resistor R1. The P-channel MOS transistors T1 and T2 together form a current mirror circuit. Similarly, the MOS transistors T1 and T3 together constitute a current mirror circuit.

This temperature detecting circuit operates in the manner described below. A constant current Ia that is made larger than the reference current flowing through the MOS transistor T1 by a given factor is constantly furnished to the diode D via the MOS transistor T2. If the temperature of the output transistor is low, the ambient temperature of the diode D and the temperature of its junction portion are also low. At this time, a large forward voltage drop takes place. The voltage at the anode of the diode D is higher than the reference voltage Vref, so that the output of the comparator CMP is low. This causes the MOS transistor T4 to conduct. The MOS transistor T3 supplies a constant current Ib to the diode D, the current Ib being larger than the reference current by a given factor. Therefore, the current $I_D$ flowing through the diode D is the sum of the constant current Ia supplied by the MOS transistor T2 and the constant current Ib supplied by the MOS transistor T3, i.e., $I_D$=Ia+Ib. The anode voltage of the diode D increases further.

Under this condition, if the temperature of the output transistor described above rises, the ambient temperature of the diode D and the temperature of the junction portion also rise, decreasing the forward voltage drop. If the anode voltage of the diode D becomes lower than the reference voltage Vref, the output from the comparator CMP goes high, thus biasing the MOS transistor T4 to cutoff. As a result, the current path going from the voltage source VD to the MOS transistor T3 is disconnected. The current $I_D$ flowing through the diode D decreases down to the constant current Ia supplied only by the MOS transistor T2. The anode voltage of the diode D decreases further. If the output from the comparator CMP goes high, the MOS transistor T5 is turned ON, and the circuit produces a low output signal at the terminal S to indicate overheating of the output transistor.

If the temperature of the diode D subsequently drops down to the temperature produced when the output from the comparator CMP went high, i.e., the temperature obtained when the overheating was detected, the anode voltage of the diode D remains lower than the reference voltage Vref, because the current $I_D$ flowing through the diode D has been decreased. When the temperature drops further and becomes lower than the temperature obtained when the overheating was detected, the output from the comparator CMP goes back to a low level. Then, the original state is restored. That is, the constant current Ia from the MOS transistor T2 and the constant current Ib from the MOS transistor T3 are supplied to the diode D. In this state, the overheating is no longer detected.

The prior art temperature-detecting circuit shown in FIG. 7A detects the rise of ambient temperature, by making use of a forward voltage drop across the diode D. The two MOS transistors T2 and T3 are connected in parallel to control a constant current supplied to the diode D. That is to say, the current path for the MOS transistor T3 is connected or disconnected by the MOS transistor T4 according to the output from the comparator CMP. This makes the current $I_D$ (=Ia) flowing through the diode D when overheating of the output transistor is detected smaller than the current $I_D$ (=Ia+Ib) flowing through the diode D when overheating thereof is not detected. By controlling the current in this way, a hysteresis width is established between the temperature at which overheating of the output transistor is detected and a restoring temperature at which the overheating thereof ceases to be detected.

In the prior art temperature-detecting circuit shown in FIG. 7A, however, when the MOS transistor T4 is driven into conduction, this transistor T4 forms a substantial resistance in the current path for the diode D. The temperature characteristic of this resistive component has made it impossible to accurately establish the hysteresis width in detecting the overheating of the output transistor.

More specifically, the hysteresis width Thys between the temperature at which the overheating of the output transistor is detected and the restoring temperature is given by the ratio of the current $I_D$ (=Ia+Ib) flowing through the diode D when the overheating thereof is not detected to the current $I_D$ (=Ia) flowing through the diode D when the overheating thereof is detected, as given by Eq. (1) below.

$$Thys=[VT \times ln\{(Ia+Ib)/Ia\}]/\alpha \tag{1}$$

where VT is a constant determined by the Boltzmann's constant k, the absolute temperature T, and the electron charge q, as given by Eq. (2) below, and α is the temperature coefficient of the forward voltage drop across the diode D. At normal temperatures, VT is approximately 26 mV.

$$VT=k \times T/q \tag{2}$$

In the temperature-detecting circuit shown in FIG. 7A, even if the temperature characteristics of the two MOS transistors T2 and T3 acting as constant current supply devices cancel out each other, the ratio of the current Ib supplied to the diode D by the MOS transistor T3 to the current Ia supplied to the diode D by the MOS transistor T2 is varied due to the temperature characteristic of the resistive component of the MOS transistor T4. As a result, the value of the { } item of Eq. (1) above varies. This makes it very difficult to maintain the hysteresis width Thys constant.

The above-cited Japanese Patent Application Laid-Open No. H.6-332555 also discloses a temperature detecting circuit as shown in FIG. 7B. This temperature detecting circuit is similar to the temperature detecting circuit shown in FIG. 7A except that a resistor R3 is connected in the current path going from the voltage source VD to this temperature detecting circuit instead of the MOS transistors T3 and T4. When the output from the comparator makes a transition from a low level to a high level (i.e., the overheating is detected), the output MOS transistor T5 is turned ON. As a result, the voltage applied to the MOS transistors T1 and T2 is decreased to a value obtained by dividing the voltage VD of the voltage source by the two resistances R2 and R3. This reduces the current $I_D$ flowing into the diode D from the MOS transistor T2. The hysteresis width used for detection of the overheating is established because of the voltage control as described above.

Even in the conventional circuit shown in FIG. 7B, however, the current $I_D$ flowing through the diode D is varied due to the temperature characteristics of the resistors R2 and R3. In consequence, it has been impossible to establish the hysteresis width accurately.

SUMMARY OF THE INVENTION

In view of the foregoing problems, the present invention has been made.

It is an object of the invention to provide a temperature detecting circuit capable of accurately establishing a hysteresis width used for detection of overheating.

This object is achieved by a temperature detecting circuit according to the present invention. The temperature detecting circuit according to the present invention has a first constant current supply device connected in series with a diode. The first constant current supply device feeds a first constant current to the diode. A second constant current supply device is connected in parallel with the first constant current supply device and in series with the diode, and feeds a second constant current to the diode. A voltage detecting circuit detects a forward voltage drop across the diode. If the detected voltage drop is smaller than a predetermined value, the voltage detecting circuit delivers an output signal indicating overheating. When the output signal indicating overheating is being produced, a bypass circuit bypasses the second constant current supplied from the second constant current supply device around the diode.

In the above-described temperature-detecting circuit, if the temperature of the diode is low and the forward voltage drop is not less than the predetermined value, the first constant current from the first constant current supply device and the second constant current from the second constant current supply device are both supplied to the diode, in the same way as the conventional circuit shown in FIG. 7A. If the temperature of the diode rises and the forward voltage drop becomes smaller than the predetermined value, only the first constant current from the first constant current supply device is supplied to the diode. Thus, a hysteresis width is established between the temperature at which overheating is detected and the restoring temperature. Any switching circuit similar to the MOS transistor T4 shown in FIG. 7A is not inserted in the current path for supplying an electrical current to the diode, unlike the aforementioned conventional circuit. Rather, the second constant current from the second constant current supply device is bypassed around the diode when overheating is detected.

Therefore, in the temperature detecting circuit, any extra resistive component is not connected in series with the current path for the diode. The temperature characteristics of the hysteresis width depend only on the temperature characteristics of the first and second constant current supply devices, more strictly on the temperature dependence of the supplied constant current. Consequently, the hysteresis width can be established quite accurately.

Let Ia be the constant current supplied to the diode by the first constant current supply device, and let Ib be the constant current supplied to the diode by the second constant current supply device. The hysteresis width is given by Eq. (1) above. The value of the item { } in Eq. (1) can be maintained constant simply by using devices having the same temperature characteristics as the first and second constant current supply devices, respectively. As a result, the hysteresis width can be regulated to be constant against temperature changes.

In the above-mentioned temperature detecting circuit, first and second transistors can be used as the first and second constant current devices. More specifically, in the temperature-detecting circuit, there is provided a transistor for producing a reference current. This transistor has two terminals consisting either of the collector and the emitter or of the drain and the source, and these two terminals are connected in series between the voltage source and the ground. A preset reference current flows between these two terminals. A first transistor cooperates with the reference current-producing transistor to form a current mirror circuit so that a current which is larger than the reference current by a given factor flows. This first transistor is used as the first constant current supply device. Similarly, a second transistor cooperating with the reference current-producing transistor to form another current mirror circuit is used as the second constant current supply device, which induces a current larger than the reference current by a second factor.

In this construction, the first and second transistors acting as the first and second constant current supply devices, respectively, can have the same temperature characteristics, i.e., these two devices can be uniform in the relation of the flowing current to temperature. Therefore, the value of the item { } in Eq. (1) can be held constant irrespective of temperature variations. Consequently, the effect of the temperature-detecting circuit (i.e., the hysteresis width can be established quite accurately) can be produced with a very simple structure.

It is to be noted that the diode in the temperature-detecting circuit can be semiconductor devices each having a PN junction that produces a forward voltage drop. Such a semiconductor device may be an ordinary diode having two terminals, a parasitic diode produced across a MOS transistor, the base and emitter of a bipolar transistor, or the base and collector.

Other objects and features of the invention will appear in the course of the description thereof, which follows.

DETAILED DESCRIPTION OF THE INVENTION

FIRST EMBODIMENT

Figure 1:
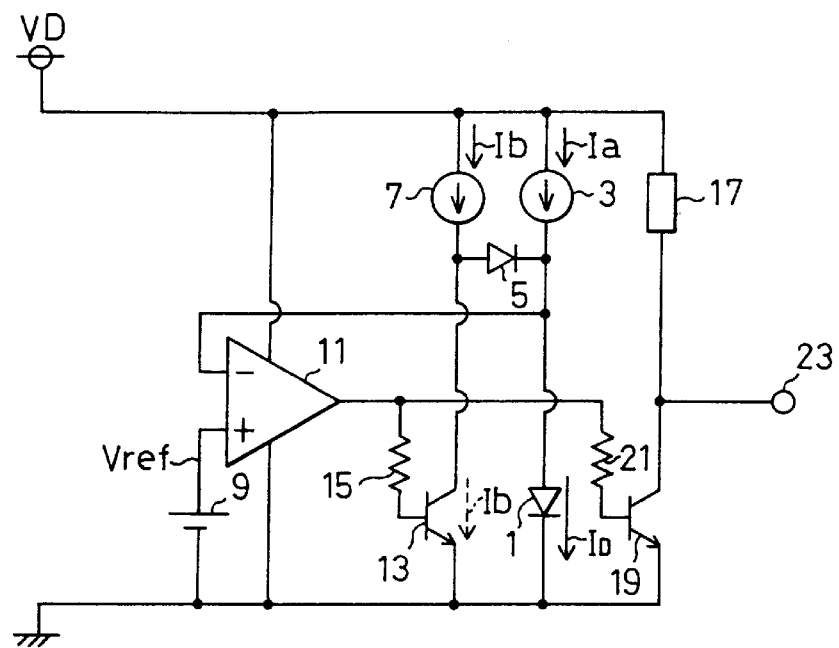
FIG. 1 is a circuit diagram of a temperature detecting circuit in accordance with a first embodiment of the present invention.

Referring to FIG. 1, there is shown a temperature-detecting circuit according to the first embodiment embodying the concept of the present invention. This circuit comprises a temperature detecting diode 1, a first constant current supply device 3, a diode 5 used for rectification, a second constant current supply device 7, a comparator 11, and an NPN transistor 13 acting as a switching device. The cathode of the temperature detecting diode 1 is coupled to ground potential, or 0 V, that is a first potential. The first constant current supply device 3 is designed so that a first constant current Ia flows between its two output terminals. One of these two output terminals is coupled to a voltage source VD (in the present embodiment, 5 V) that offers a second potential higher than ground potential, while the other terminal is connected with the anode of the temperature-detecting diode 1. The cathode of the rectifying diode 5 is connected with the anode of the temperature detecting diode 1. The second constant current supply device 7 is designed so that a second constant current Ib flows between its two output terminals. One of these two output terminals of the second constant current supply device 7 is coupled to the voltage source VD, whereas the other is connected with the anode of the rectifying diode 5. The comparator 11 compares a reference voltage Vref from a reference voltage source 9 with the voltage at the anode of the temperature detecting diode 1. When the voltage at the anode of the temperature detecting diode 1 is lower than the reference voltage Vref, the comparator produces a high-level signal indicating overheating. The collector of the NPN transistor 13 is connected with the anode of the rectifying diode 5. The emitter of the transistor 13 is coupled to ground potential. The base of the transistor 13 is connected with the output terminal of the comparator 11 via a resistor 15.

The present temperature-detecting circuit is equipped with an output buffer consisting of an impedance device 17 and an NPN transistor 19. The impedance device 17 consists of a resistor or a constant-current source whose one end is connected with the voltage source VD. The collector of the NPN transistor 19 is connected with the end of the impedance device 17 on the opposite side of the end connected to the voltage source VD. The emitter of the transistor 19 is grounded. The base of the transistor 19 is connected with the output terminal of the comparator 11 via a resistor 21.

The above-described output buffer is provided so that the output from the comparator 11 is taken from an output terminal 23 connected with the collector of the transistor 19 with increased current-driving capability. In the present embodiment, the output from the comparator 11 is inverted and produced from the output terminal 23. This output buffer consisting of the impedance device 17 and the transistor 19 may also be omitted.

The reference voltage Vref applied to the comparator 11 from the reference voltage source 9 is so set that the temperature of the junction portion of the temperature-detecting diode 1 corresponds to the forward voltage drop (e.g., approximately 0.6 V) developed across the temperature-detecting diode 1 provided that both first constant current Ia and second constant current Ib flow through the diode 1.

The details of the temperature detecting circuit described above is particularly shown in FIG. 2. This circuit includes a PNP transistor 25 acting to produce a reference current and a constant current supply circuit 27, in addition to the various devices shown in FIG. 1. The base and collector of the PNP transistor 25 are tied together. The emitter of the PNP transistor 25 is coupled to the voltage source VD. One end of the constant current supply circuit 27 is connected with the collector of the transistor 25, the other end being grounded. The constant current supply circuit 27 supplies a constant reference current Iref to the transistor 25 (strictly, between the emitter and collector of the transistor 25).

In the first embodiment, a PNP transistor is used as the first transistor 3, or the first constant current supply device 3, whose base is connected to the base of the transistor 25. This first transistor 3 and the transistor 25 together form a current mirror circuit, which supplies the first constant current Ia that is larger than the reference current Iref by a first factor $n_1$. Similarly, another PNP transistor is employed as the second transistor 7, or the second constant current supply device 7, whose base is connected to the base of the transistor 25. This second transistor 7 and the transistor 25 together constitute another current mirror circuit for supplying a second constant current Ib that is larger than the reference current Iref by a second factor $n_2$.

The ratio of the first constant current Ia to the reference current Iref, i.e., the first factor $n_1$, is the mirror ratio of the current mirror circuit determined by the sizes of the transistors 25 and 3. Likewise, the ratio of the second constant current Ib to the reference current Iref, i.e., the second factor $n_2$, is the mirror ratio of the current mirror circuit determined by the sizes of the transistors 25 and 7.

In the first embodiment, a PNP transistor whose base is connected to the base of the transistor 25 is used as the impedance device 17 of the output buffer. This PNP transistor 17 and the transistor 25 together form a further current mirror circuit for supplying a current that is larger than the reference current Iref by a given factor.

Figure 2:
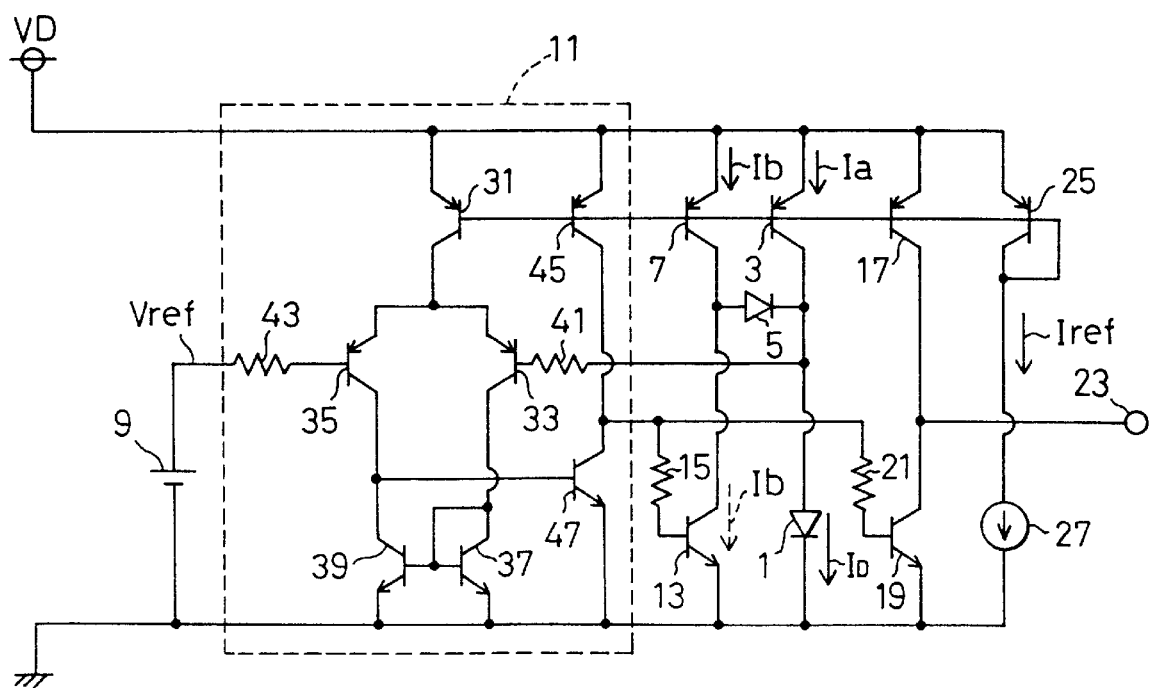
FIG. 2 is a circuit diagram particularly showing the details of the circuit shown in FIG. 1.

As shown in FIG. 2, the comparator 11 comprises seven bipolar transistors 31, 33, 35, 37, 39, 45, 47 and two input-protecting resistors 41, 43 and has a well-known construction. The terminal of the input-protecting resistor 41 on the opposite side of the transistor 33 is connected as a negative (−) terminal to the anode of the temperature-detecting diode 1. The terminal of the input-protecting resistor 43 on the opposite side of the transistor 35 is connected as a positive (+) terminal to the reference voltage source 9. Also in the first embodiment, the various devices of the temperature-detecting circuit shown in FIG. 2 are fabricated on the same semiconductor chip.

The temperature-detecting circuit constructed in this way operates as follows. The voltage source VD constantly supplies the first constant current Ia (=Iref×$n_1$) to the temperature-detecting diode 1 via the first constant current supply device 3 (strictly, between the emitter and collector of the transistor 3).

Where the ambient temperature of this temperature-detecting circuit is low, the temperature of the junction portion of the temperature-detecting diode 1 is also low, and therefore, the forward voltage drop thereof is large. If the voltage at the anode of the temperature-detecting diode 1 is not lower than the reference voltage Vref, the output from the comparator 11 is low, thus biasing the transistor 13 to cutoff. At this time, the second constant current Ib (=Iref×$n_2$) flows into the temperature-detecting diode 1 from the voltage source VD via the second constant current supply device 7 (strictly, between the emitter and collector of the transistor 7) and via the rectifying diode 5. As a result, the current $I_D$ flowing through the temperature-detecting diode 1 is the sum (Ia+Ib) of the first constant current Ia supplied from the first constant current device 3 and the second constant current Ib supplied from the second constant current supply device 7. Hence, the voltage at the anode of the temperature-detecting diode 1 is increased further.

Under this condition, if the ambient temperature of the temperature-detecting circuit rises, the temperature of the junction portion of the temperature-detecting diode 1 increases, and the forward voltage drop thereof decreases. When the voltage at the anode of the temperature-detecting diode 1 becomes lower than the reference voltage Vref, the output from the comparator 11 makes a transition from a low level to a high level indicating overheating. This drives the transistor 13 into conduction. This shorts the anode of the rectifying diode 5 to ground potential. Therefore, the second constant current Ib sent from the voltage source VD via the second constant current supply device 7 flows into the ground potential via the transistor 13 without via the temperature-detecting diode 1, as indicated by the broken lines in FIGS. 1 and 2. Consequently, the current $I_D$ flowing into the temperature-detecting diode 1 decreases down to the first current Ia supplied only by the first constant supply device 3. This reduces the voltage at the anode of the temperature-detecting diode 1 further.

When the transistor 13 is driven ON, the first constant current Ia flowing from the voltage source VD via the first constant current supply device 3 is prevented from flowing into the transistor 13 by the rectifying diode 5. Thus, the first constant current keeps flowing into the temperature-detecting diode 1. When the output from the comparator 11 goes high, the transistor 19 is turned ON. A low-level signal indicating overheating appears on the output terminal 23 and is sent out of this temperature-detecting circuit.

If the temperature of the temperature-detecting diode 1 subsequently falls to the temperature at which the output from the comparator 11 made a transition to the high level (i.e., the temperature at which overheating was detected), the voltage at the anode of the temperature-detecting diode 1 remains below the reference voltage Vref, because the current $I_D$ flowing into the temperature-detecting diode 1 has been decreased. When the temperature drops further, the output from the comparator 11 goes back to a low level, so that the original state of the circuit is regained. That is, the first constant current Ia from the first constant current supply device 3 and the second constant current Ib from the second constant current supply device 7 both flow into the temperature-detecting diode 1.

That is, in the present example of temperature-detecting circuit, if the temperature of the temperature-detecting diode 1 is low and the voltage at the anode is not lower than the reference voltage Vref, the first constant current Ia from the first constant current supply device 3 and the second constant current Ib from the second constant current supply device 7 are both supplied into the temperature-detecting diode 1. If the temperature of the temperature-detecting diode 1 rises and the voltage at the anode decreases below the reference voltage Vref, only the first constant current Ia from the first constant current supply device 3 is supplied to the temperature-detecting diode 1. In this way, a hysteresis width is established between the temperature at which overheating is detected and the restoring temperature at which the overheating is no longer detected.

The present embodiment is especially characterized in that, if the voltage at the anode of the temperature-detecting diode 1 decreases below the reference voltage Vref and overheating is detected, the second constant current Ib flowing from the voltage source VD into the temperature-detecting diode 1 via the second constant current supply device 7 is directly coupled to ground potential (i.e., the potential at the cathode of the temperature-detecting diode 1) by the transistor 13. In this manner, the current $I_D$ flowing into the temperature-detecting diode 1 is reduced.

Figure 7A:
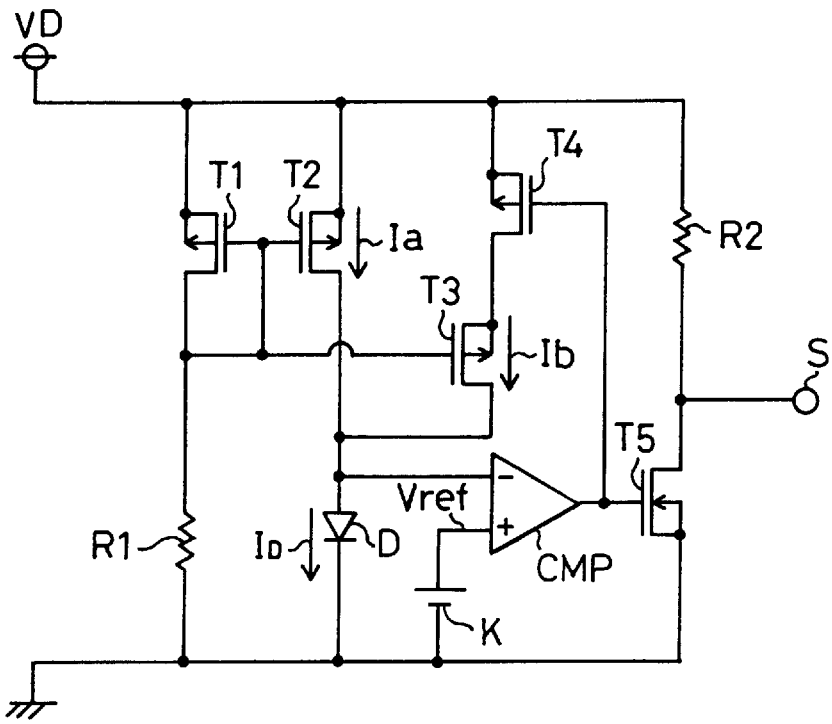
FIGS. 7A and 7B are circuit diagrams of the prior art temperature-detecting circuits.
Figure 7B:
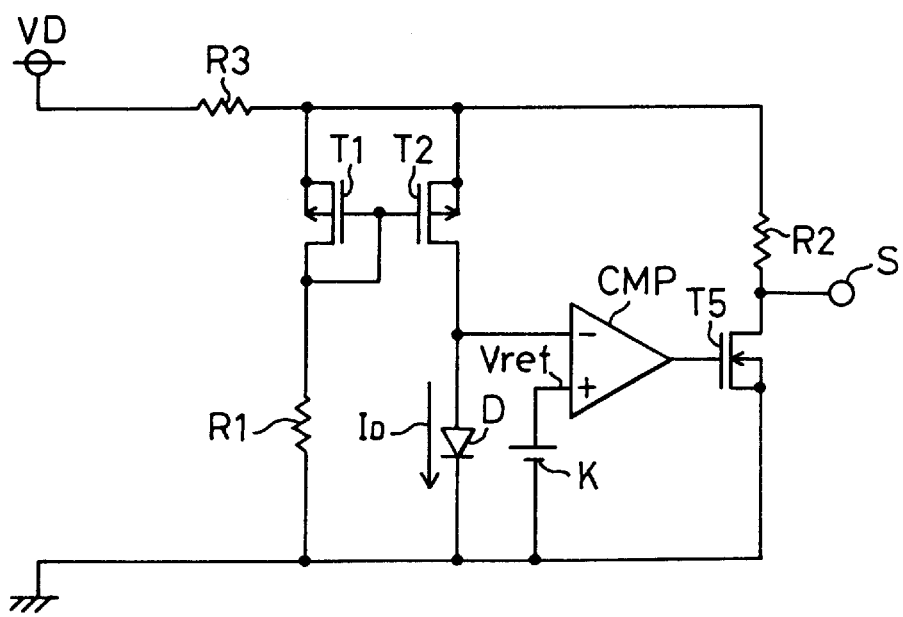

Therefore, in the present temperature-detecting circuit, any extra resistive component is not connected in series within the current path for the temperature-detecting diode 1, unlike the prior art circuit shown in FIG. 7A. In consequence, the hysteresis width can be established quite accurately.

More specifically, the hysteresis width is given by Eq. (1) above. The value of the item { } of Eq. (1) can be held constant as long as transistors having the same temperature characteristics (i.e., these transistors are uniform in the relation of the flowing current to temperature) are used as the first and second constant current supply devices 3 and 7, respectively. In the first embodiment, the first constant current supply device 3 and the second constant current supply device 7 are the transistors 3 and 7 that cooperate with the reference current-producing transistor 25 to form current mirror circuits. Consequently, the first constant current supply device 3 and the second constant current supply device 7 are made uniform in temperature characteristics. The value of the item { } of Eq. (1) is maintained constant in spite of temperature variations. For these reasons, the hysteresis width can be established with high accuracy irrespective of temperature variations. This in turn permits accurate detection of temperature or overheating.

The comparator 11 of the first embodiment corresponds to the voltage-detecting circuit. The rectifying diode 5 and transistor 13 of the first embodiment correspond to the bypass circuit.

SECOND EMBODIMENT

Figure 3:
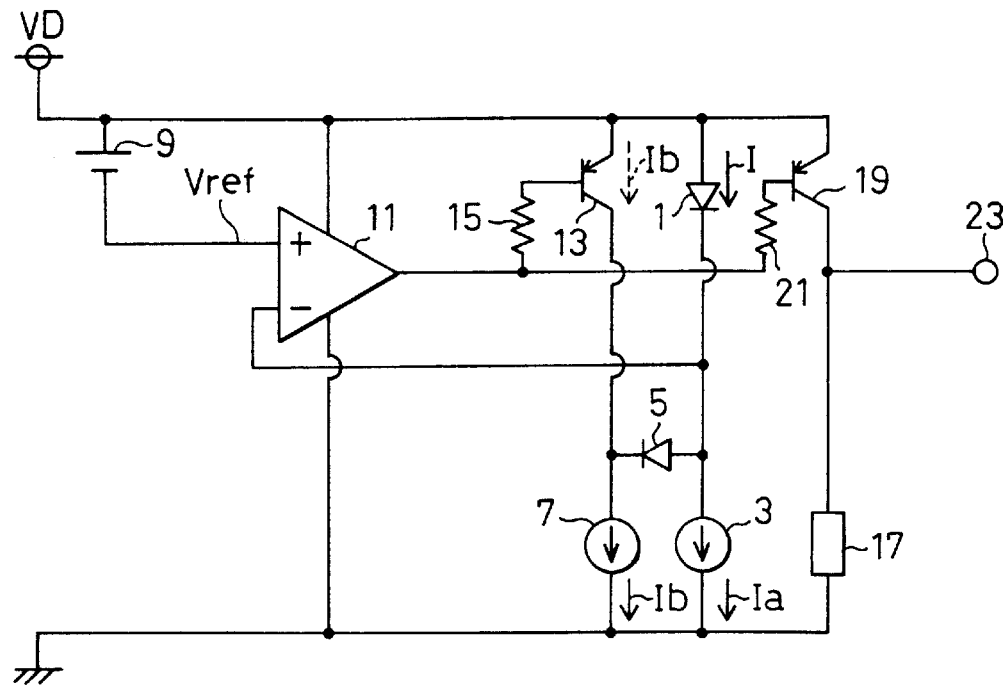
FIG. 3 is a circuit diagram of a temperature detecting circuit in accordance with a second embodiment of the present invention.
Figure 4:
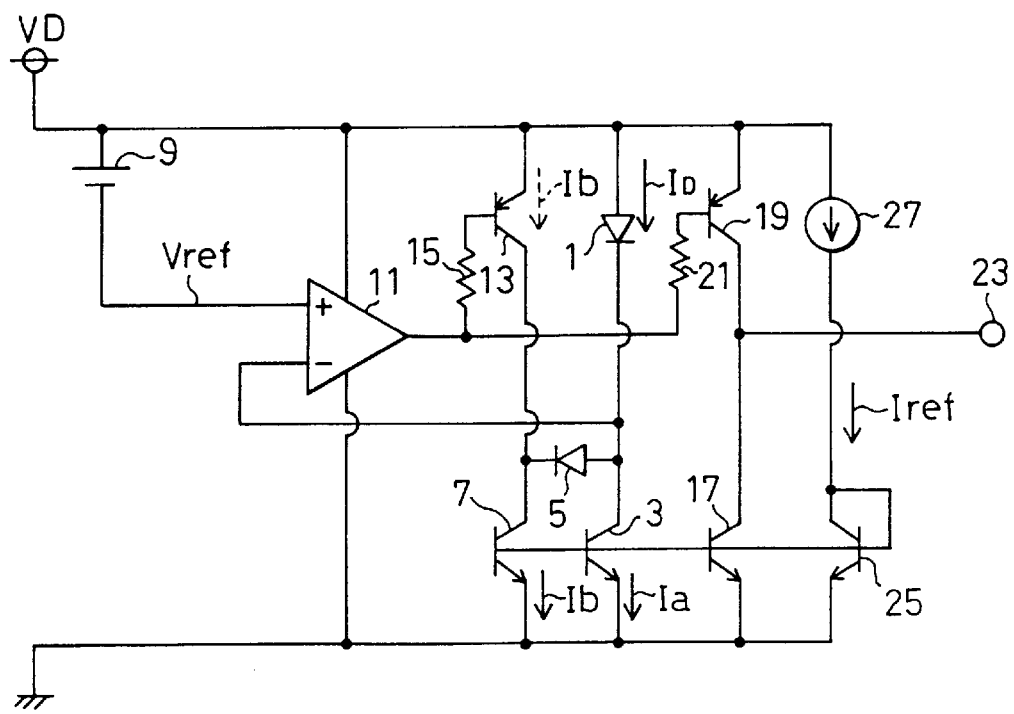
FIG. 4 is a circuit diagram particularly showing the details of the circuit shown in FIG. 3.

In the first embodiment described above, the first and second constant current supply devices 3 and 7, respectively, are coupled to a higher potential than the temperature-detecting diode 1. In the second embodiment about to be described by referring to FIGS. 3 and 4, the first and second constant current supply devices 3 and 7, respectively, are placed at a lower potential side rather than the temperature-detecting diode 1. FIG. 3 is a circuit diagram of a temperature-detecting circuit according to the second embodiment of the present invention. FIG. 4 is a diagram similar to FIG. 2 but particularly shows the details of the circuit of FIG. 3.

The temperature-detecting circuit shown in FIGS. 3 and 4 differs from the temperature-detecting circuit described already in connection with FIGS. 1 and 2 in that the positions of the ground potential and the voltage source VD are interchanged. Also, this temperature-detecting circuit shown in FIGS. 3 and 4 differs from the temperature-detecting circuit shown in FIGS. 1 and 2 mainly as to the following points (1)–(4).

(1) The anode of the temperature-detecting diode 1 is connected with the voltage source VD. One of the two output terminals of the first constant current device 3 is coupled to ground potential, while the other is connected with the cathode of the temperature-detecting diode 1. The anode of the rectifying diode 5 is connected with the cathode of the temperature-detecting diode 1. One of the two output terminals of the second constant current supply device 7 is grounded, while the other is connected with the cathode of the rectifying diode 5.

(2) The reference voltage Vref applied to the comparator 11 from the reference voltage source 9 is set to a value (e.g., approximately 4.4 V) equal to the voltage VD of the voltage source minus the reference voltage Vref described in the first embodiment. The comparator 11 compares the voltage at the cathode of the temperature-detecting diode 1 with the reference voltage Vref from the reference voltage source 9. When the voltage at the cathode is higher than the reference voltage Vref, the comparator 11 produces a low-level signal indicating overheating.

(3) A PNP transistor is used as the transistor 13. The emitter of the transistor 13 is connected with the voltage source VD, while the collector thereof is connected with the cathode of the rectifying diode 5.

(4) The transistor 25 for producing the reference current makes use of an NPN transistor and is coupled to a lower potential (ground potential) side rather than the constant current supply circuit 27, in accompaniment to the modifications (1) to (3). The transistor 3 acting as the first constant current supply device 3 and the transistor 7 serving as the second constant current supply device 7 each consist of an NPN transistor. Also, an NPN transistor is used as the impedance device 17, or transistor 17. A PNP transistor is employed as the transistor 19, which is placed on a higher potential (the voltage source VD) side rather than the impedance device 17.

The temperature-detecting circuit constructed as described thus far forms a second embodiment of the present invention, and is similar in operation and advantages to the temperature-detecting circuit described previously in conjunction with FIGS. 1 and 2 except that the direction of electrical current is reversed.

More specifically, when the temperature of the temperature-detecting diode 1 is low, the forward voltage drop is large, and the voltage at the cathode is not higher than the reference voltage Vref, the first constant current Ia flows into ground potential from the voltage source VD via the temperature-detecting diode 1 and via the first constant current supply device 3 (strictly, between the collector and emitter of the transistor 3). Also, the second constant current Ib flows from the voltage source VD into ground potential via all of the temperature-detecting diode 1, the rectifying diode 5, and the second constant current supply device 7 (strictly, between the collector and emitter of the transistor 7). As a result, the sum of the first constant current Ia and the second constant current Ib flows through the temperature-detecting diode 1.

When the temperature goes up, the forward voltage drop across the temperature-detecting diode 1 decreases, and the voltage at the cathode increases beyond the reference voltage Vref (i.e., overheating is detected), the output from the comparator 11 makes a shift from a high level to a low level, indicating overheating. This drives the transistor 13 into conduction, which in turn shorts the cathode of the rectifying diode 5 to the voltage source VD. Therefore, the second constant current Ib flowing into the temperature-detecting diode 1 now flows into ground potential from the voltage source VD via the transistor 13 and via the second constant current supply device 7, as indicated by the broken lines in FIGS. 3 and 4.

When the transistor 13 is turned ON, the current flowing from the voltage source VD via the transistor 13 is prevented from flowing into the first constant current supply device 3 (transistor 3) by the rectifying diode 5. It follows that the first constant current Ia which would otherwise flow into the first constant current supply device 3 keeps flowing into the temperature-detecting diode 1. When the output from the comparator 11 goes low, the transistor 19 is turned ON. The result is that a high-level signal indicating overheating appears at the output terminal 23 and is produced out of this temperature-detecting circuit.

Also in this temperature-detecting circuit forming the second embodiment of the present invention, any extra resistive component is not connected in series within the current path for the temperature-detecting diode 1. In consequence, the hysteresis width can be established quite accurately in exactly the same way as in the temperature-detecting circuit forming the first embodiment. As a result, accurate detection of temperature or overheating is enabled.

In the above-described temperature-detecting circuits forming the first and second embodiments of the present invention, bipolar transistors are used as the various transistors making up the circuit. Instead, the circuit may also be made up from MOS transistors as in third and fourth embodiments described below.

THIRD EMBODIMENT

Figure 5:
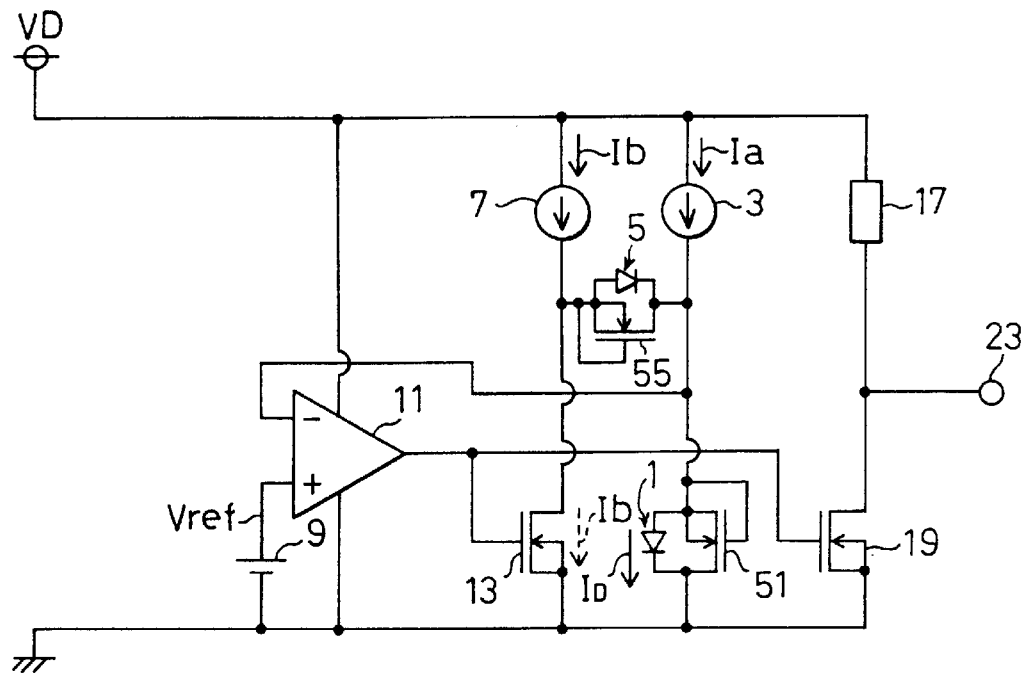
FIG. 5 is a circuit diagram of a temperature detecting circuit in accordance with the third embodiment of the present invention.

FIG. 5 is a circuit diagram of a temperature-detecting circuit according to the third embodiment of the present invention. This temperature-detecting circuit is similar to the first-mentioned temperature-detecting circuit described in connection with FIGS. 1 and 2 except that MOS transistors are used instead of bipolar transistors. In particular, the NPN transistors shown in FIGS. 1 and 2 are replaced by N-channel MOS transistors. The PNP transistors shown in FIGS. 1 and 2 are replaced by P-channel MOS transistors. The resistors 15 and 21 for limiting the currents flowing into the bases of the transistors 13 and 19 are omitted.

This temperature-detecting circuit of the third embodiment differs from the temperature-detecting circuit of the first embodiment in that a parasitic diode of an N-channel MOS transistor 51 whose gate and source are shorted to each other is used as the temperature-detecting diode 1, and in that a parasitic diode of an N-channel MOS transistor 55 whose gate and source are shorted to each other is used as the rectifying diode 5. The operation of this temperature-detecting circuit is exactly the same as the operation of the temperature-detecting circuit of the first embodiment. This temperature-detecting circuit of the third embodiment is most suitably fabricated by CMOS fabrication technologies.

FOURTH EMBODIMENT

Figure 6:
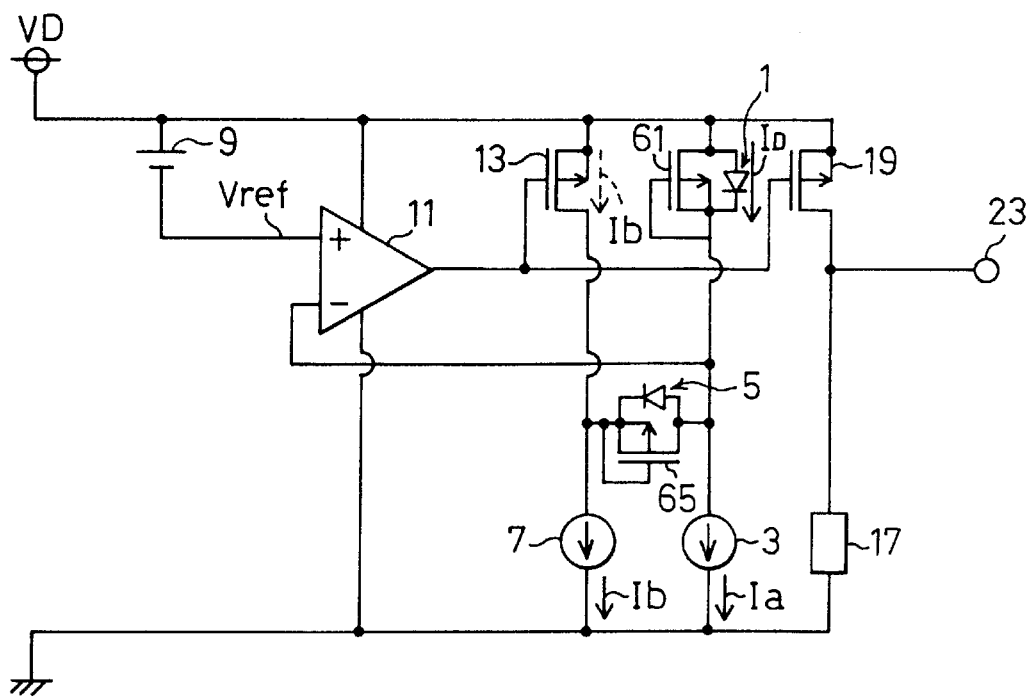
FIG. 6 is a circuit diagram of a temperature detecting circuit in accordance with the fourth embodiment of the present invention.

FIG. 6 is a circuit diagram of a temperature-detecting circuit according to the fourth embodiment of the present invention. This temperature-detecting circuit is similar to the temperature-detecting circuit forming the second embodiment except that MOS transistors are used as the above-described transistors. In particular, N-channel MOS transistors are used instead of the NPN transistors shown in FIGS. 3 and 4. P-channel MOS transistors are used instead of the PNP transistors shown in FIGS. 3 and 4. The resistors 15 and 21 for limiting the currents flowing into the bases of the transistors 13 and 19 are omitted.

This temperature-detecting circuit of the fourth embodiment differs from the temperature-detecting circuit of the second embodiment in that a parasitic diode of a P-channel MOS transistor 61 whose gate and source are shorted to each other is used as the temperature-detecting diode 1, and in that a parasitic diode of a P-channel MOS transistor 65 whose gate and source are shorted to each other is used as the rectifying diode 5. The operation of this temperature-detecting circuit is exactly the same as the operation of the temperature-detecting circuit of the second embodiment. This temperature-detecting circuit of the fourth embodiment is most suitably fabricated by CMOS technologies similarly to the third embodiment.

OTHER MODIFICATIONS

Where the temperature-detecting circuit is fabricated by Bi-CMOS fabrication technologies, the circuit configuration of FIG. 1 may be combined with the circuit configuration of FIG. 5. Also, the circuit configuration of FIG. 3 may be combined with the circuit configuration of FIG. 6. That is, the temperature-detecting circuit may be manufactured, using both bipolar and MOS transistors as the above-described transistors.

In the first and second embodiments, ordinary diodes are used as the temperature-detecting diode 1 and as the rectifying diode 5. Alternatively, between the base and the collector of the bipolar transistor in which the base and the emitter are short-circuited or between the base and the emitter of the bipolar transistor in which the base and the collector are short-circuited, diode 1 or 5 may be formed. Furthermore, instead of the parasitic diodes of the MOS transistors 51, 55, 61, and 65 in the temperature-detecting circuits of the third and fourth embodiments, ordinary diodes, the base-emitter, or base-collector of the bipolar transistor as described above may be used as diode 1 or 5.

What is claimed is:

1. A temperature detecting circuit for detecting the rise and ambient temperature by making use of forward voltage drop produced across a diode, said temperature-detecting circuit comprising:

a first constant current supply device connected in series with said diode, for supplying a first constant current to said diode;

a second constant current supply device connected in parallel with said first constant current supply device and in series with said diode, for supplying a second constant current to said diode;

a voltage-detecting circuit for detecting said forward voltage drop across said diode and producing an output signal indicating overheating when said forward voltage drop is smaller than a predetermined value; and a bypass circuit for bypassing said second constant current supplied from said second constant current supply device around said diode when said voltage detecting circuit is producing said output signal.

2. A temperature detecting circuit comprising:

a temperature detecting diode having an anode and a cathode, said cathode being provided with a first potential;

a first constant current supply device having a first and a second output terminals across which a first constant current is passed, said first output terminal being provided with a second potential higher than said first potential, said second output terminal being connected with the anode of said temperature detecting diode;

a rectifying diode having a cathode connected with the anode of said temperature detecting diode;

a second constant current supply device having a first and a second output terminals across which a second constant current is passed, said first output terminal of said second constant current supply device being provided with said second potential, said second output terminal of said second constant current supply device being connected with the anode of said rectifying diode;

a comparator for comparing a voltage produced at the anode of said temperature detecting diode with a preset reference voltage and producing an output signal indicating overheating when the voltage at the anode of said temperature detecting diode is lower than said reference voltage; and a switching device for shorting the anode of said rectifying diode to said first potential when said comparator is producing said output signal.

3. The temperature-detecting circuit as set forth in claim 2, further comprising:

a transistor for producing a reference current, said transistor having two output terminals consisting of a collector and an emitter or of a drain and a source, said two output terminals being connected in series between said first and second potentials, said transistor being constructed so that a preset constant current flows between said two output terminals, wherein said first constant current supply device is a first transistor cooperating with said transistor for producing the reference current to form a current mirror circuit that feeds as said first constant current a current larger than said reference current by a first factor, and wherein said second constant current supply device is a second transistor cooperating with said transistor for producing the reference current to form another current mirror circuit that feeds as said second constant current a current larger than said reference current by a second factor.

4. A temperature detecting circuit comprising:

a temperature detecting diode having a cathode and an anode, said anode being provided with a first potential;

a first constant current supply device having a first and a second output terminals across which a first constant current is passed, said first output terminal being provided with a second potential lower than said first potential, said second output terminal being connected with the cathode of said temperature-detecting diode;

a rectifying diode having an anode connected with the cathode of said temperature-detecting diode;

a second constant current supply device having a first and a second output terminals across which a second constant current is passed, said first output terminal being provided with said second potential, said second output terminal being connected with the cathode of said rectifying diode;

a comparator for comparing a voltage produced at the cathode of said temperature-detecting diode with a preset reference voltage and producing an output signal indicating overheating when the voltage at the cathode of said temperature detecting diode is higher than said reference voltage; and a switching device for shorting the cathode of said rectifying diode to said first potential when said comparator is producing said output signal.

5. The temperature-detecting circuit as set forth in claim 4, further comprising:

a transistor for producing a reference current, said transistor having two output terminals consisting of a collector and an emitter or of a drain and a source, said two output terminals being connected in series between said first and second potentials, said transistor being constructed so that a preset constant current flows between said two output terminals, wherein said first constant current supply device is a first transistor cooperating with said transistor for producing the reference current to form a current mirror circuit that feeds as said first constant current a current larger than said reference current by a first factor, and wherein said second constant current supply device is a second transistor cooperating with said transistor for producing the reference current to form another current mirror circuit that feeds as said second constant current a current larger than said reference current by a second factor.

* * * * *